(12) United States Patent
Schurig et al.

(10) Patent No.: US 12,103,126 B2
(45) Date of Patent: Oct. 1, 2024

(54) SUCTION ADAPTER FOR CONNECTING AN INSERTION TOOL TO A SUCTION APPARATUS

(71) Applicant: Robert Bosch GmbH, Stuttgart (DE)

(72) Inventors: Andreas Schurig, Lyss (CH); Edit Okenwa, Solothurn (CH); Fritz Schlegel, Stuttgart (DE); Hardy Schmid, Stuttgart (DE); Holger Froehling, Stuttgart (DE); Michael Briesenick, Stuttgart (DE); Stefan Sonntag, Vogt (DE); Tamara Gaschler, Ravensburg (DE)

(73) Assignee: Robert Bosch GmbH, Stuttgart (DE)

( * ) Notice: Subject to any disclaimer, the term of this patent is extended or adjusted under 35 U.S.C. 154(b) by 489 days.

(21) Appl. No.: 17/358,996

(22) Filed: Jun. 25, 2021

(65) Prior Publication Data
US 2022/0001503 A1   Jan. 6, 2022

(30) Foreign Application Priority Data
Jul. 3, 2020   (DE) ..................... 10 2020 208 387.8

(51) Int. Cl.
*B23Q 11/00*   (2006.01)
*B23B 45/00*   (2006.01)

(52) U.S. Cl.
CPC ........ *B23Q 11/0046* (2013.01); *B23B 45/003* (2013.01); *B23Q 11/0071* (2013.01); *B23B 2270/62* (2013.01)

(58) Field of Classification Search
CPC .............. B23B 45/003; B23B 2270/62; B23Q 11/0046; B23Q 11/006; B23Q 11/0071
See application file for complete search history.

(56) References Cited

U.S. PATENT DOCUMENTS

| | | | | |
|---|---|---|---|---|
| 2018/0311778 A1* | 11/2018 | Meiser | ............... | B23Q 11/0071 |
| 2020/0156199 A1* | 5/2020 | Richards | ............ | B23Q 11/0071 |
| 2020/0230765 A1* | 7/2020 | Sonntag | ............. | B23Q 11/0046 |

FOREIGN PATENT DOCUMENTS

| | | | |
|---|---|---|---|
| CH | 693 873 A5 | 3/2004 | |
| DE | 10 2011 087 360 A1 | 5/2013 | |
| DE | 10 2014 102 314 A1 | 8/2015 | |
| DE | 10 2017 206 975 A1 | 10/2018 | |
| DE | 10 2017 219 447 A1 | 5/2019 | |
| EP | 1872899 A1 * | 1/2008 | ......... B23Q 11/0046 |

* cited by examiner

*Primary Examiner* — Sunil K Singh
*Assistant Examiner* — Eric Daniel Whitmire
(74) *Attorney, Agent, or Firm* — Maginot, Moore & Beck LLP

(57) ABSTRACT

A suction adapter, in particular a suction drill suction adapter, for connecting an insertion tool, in particular a suction drill, to a suction apparatus includes at least one insertion tool receiving region, in which the insertion tool is arranged, at least one connection interface with respect to an insertion tool suction channel of the insertion tool, and at least one, in particular dimensionally stable, discharge guiding unit configured to delimit a suction channel. The at least one discharge guiding unit has at least one discharge guiding element configured to delimit a suction channel outlet of the suction channel and which has a longitudinal axis. The longitudinal axis of the at least one discharge guiding element is orientated parallel with a main extent axis of the at least one insertion tool receiving region in a region of the suction channel outlet in at least one operating state.

16 Claims, 7 Drawing Sheets

SUCTION ADAPTER FOR CONNECTING AN INSERTION TOOL TO A SUCTION APPARATUS

This application claims priority under 35 U.S.C. § 119 to patent application no. DE 10 2020 208 387.8, filed on Jul. 3, 2020 in Germany, the disclosure of which is incorporated herein by reference in its entirety.

BACKGROUND

DE 10 2014 102 314 A1 has already proposed a suction adapter for connecting an insertion tool to a suction apparatus, having at least one insertion tool receiving region, in which the insertion tool can be arranged and which has at least one connection interface with respect to an insertion tool suction channel of the insertion tool, and having at least one discharge guiding unit which delimits a suction channel.

SUMMARY

The disclosure relates to a suction adapter, in particular a suction drill suction adapter, for connecting an insertion tool, in particular a suction drill, to a suction apparatus, having at least one insertion tool receiving region, in which the insertion tool can be arranged and which has at least one connection interface with respect to an insertion tool suction channel of the insertion tool, and having at least one, in particular dimensionally stable, discharge guiding unit which delimits a suction channel.

It is proposed that the discharge guiding unit have at least one discharge guiding element which delimits a suction channel outlet of the suction channel and which has a longitudinal axis, wherein the longitudinal axis of the discharge guiding element is orientated parallel with a main extent axis of the insertion tool receiving region in a region of the suction channel outlet in at least one operating state. The term "main extent axis" of an object is intended in this case to be understood in particular to be an axis which extends parallel with a longest edge of a smallest geometric parallelepiped which just completely surrounds the object. The suction adapter is preferably provided to be arranged on an insertion tool. The insertion tool is preferably provided for arrangement in an insertion tool receiving member of a hand-operated machine tool. The suction adapter is preferably provided to produce a mechanical, in particular technical fluidic, connection of the insertion tool suction channel of the insertion tool, in particular via the suction channel which is delimited by the discharge guiding unit, having a suction apparatus housing, in particular a suction apparatus suction channel of the suction apparatus, which is preferably delimited by the suction apparatus housing. The suction adapter is particularly provided to allow suction of a waste material from a workpiece which is processed by means of the insertion tool by connecting the insertion tool to the suction apparatus. The discharge guiding unit is preferably provided to guide a waste material which is produced during processing of a workpiece with the insertion tool at which the suction adapter is preferably arranged, during a suction action by the suction apparatus which is connected in particular to the insertion tool by means of the suction adapter, particularly preferably in a direction away from the insertion tool. In a state mounted on the suction apparatus, the suction channel outlet preferably opens in a suction channel inlet of the suction apparatus suction channel of the suction apparatus. The discharge guiding unit, in particular the discharge guiding element, is preferably constructed as a hollow member. In a particularly preferable manner, the discharge guiding unit, in particular the discharge guiding element, is constructed at least partially in a tubular manner. The insertion tool receiving region is preferably arranged inside the discharge guiding unit. In particular, the insertion tool receiving region is at least substantially completely surrounded by the discharge guiding unit, in particular delimited. The term "at least substantially completely" is intended to be understood to mean in particular at least 50%, preferably at least 75% and particularly preferably at least 90% of a total volume and/or a total mass of a region or an object, in particular the insertion tool receiving region. The discharge guiding unit has in particular at least one opening, preferably at least two openings, in a side wall of the discharge guiding unit, through which the insertion tool can be guided during connection to the suction adapter in order in particular to position the insertion tool in the insertion tool receiving region.

The region of the suction channel outlet in which the longitudinal axis of the discharge guiding element in at least one operating state is orientated parallel with the main extent axis of the insertion tool receiving region preferably has a maximum length, in particular at least when viewed from the suction channel outlet along the longitudinal axis of the discharge guiding element, which preferably corresponds to at least 25% of a maximum internal diameter of the suction channel outlet. Alternatively, it is also conceivable for the maximum length of the region of the suction channel outlet in which the longitudinal axis of the discharge guiding element is orientated parallel with the main extent axis of the insertion tool receiving region in at least one operating state, in particular at least when viewed from the suction channel outlet along the longitudinal axis of the discharge guiding element, to correspond to at least 50%, at least 75%, 100% or less than 25% of the maximum internal diameter of the suction channel outlet. The longitudinal axis of the discharge guiding element preferably extends, in particular in at least one embodiment, parallel with the main extent axis of the insertion tool receiving region if the suction adapter, in particular the discharge guiding element, is connected to a suction apparatus of a hand-operated machine tool. However, it is in principle also conceivable for the longitudinal axis of the discharge guiding element to extend at least parallel with the main extent axis of the insertion tool receiving region if the suction adapter, in particular the discharge guiding element, is connected to an external suction apparatus. The suction apparatus of the hand-operated machine tool is preferably constructed as a suction module which can preferably be releasably fixed to the hand-operated machine tool and which is particularly preferably configured to be fitted for operation of the suction module to the hand-operated machine tool. However, it is also conceivable for the suction apparatus of the hand-operated machine tool to be constructed as a suction apparatus which is integrated in a housing of the hand-operated machine tool. The external suction apparatus can be constructed, for example, as a vacuum cleaner or the like.

Preferably, the discharge guiding unit, in particular at least the discharge guiding element, is formed by a dimensionally stable material. The term "dimensionally stable material" is intended to be understood to mean in particular an at least substantially rigid or solid material. Preferably, the discharge guiding unit is formed by an at least substantially flexurally strong material, in particular constructed differently from a hose. The discharge guiding unit is preferably constructed with thin walls. The discharge guiding unit is, for example, formed from a metal or a plastics material and is in particular constructed in such a manner that the discharge guiding unit is resistant to bending. It is conceivable for the discharge guiding unit to be formed from a single component or to be formed from a plurality of components. In particular, the discharge guiding element has at least in the region of the suction channel outlet a round internal cross section and/or external cross section. However, it is also conceivable for the internal cross section and/or the external cross section to be constructed polygonally in the region of the suction channel outlet. As a result of the configuration according to the disclosure of the suction adapter, it is advantageously possible to produce a connection of an insertion tool to a suction apparatus in a particularly comfortable manner. A particularly high level of flexibility of a suction adapter can advantageously be achieved. A connection of the suction adapter to the insertion tool and to the suction apparatus can advantageously be produced with one manipulation or operation.

It is further proposed that an orientation of the longitudinal axis of the discharge guiding element relative to the main extent axis of the insertion tool receiving region be adjustable. Preferably, the discharge guiding unit has at least two different adjustment positions, in which the orientation of the longitudinal axis of the discharge guiding element differs in particular. In at least one first adjustment position of the discharge guiding unit, the longitudinal axis of the discharge guiding element preferably extends parallel with the main extent axis of the insertion tool receiving region. In at least one second adjustment position, the longitudinal axis of the discharge guiding element preferably extends perpendicularly to the main extent axis of the insertion tool receiving region. In particular, it is also conceivable, preferably in at least one embodiment, for the discharge guiding unit, preferably the discharge guiding element, to be adjustable in at least one orientation plane steplessly or in a stepped manner, particularly preferably relative to the main extent axis of the insertion tool receiving region, in order to orientate or adjust in particular the longitudinal axis of the discharge guiding element in the orientation plane in different manners, The orientation plane preferably extends at least substantially parallel with or at least substantially perpendicularly to the main extent axis of the insertion tool receiving region. The expression "substantially perpendicularly" is intended to be understood here in particular to define an orientation of a direction relative to a reference direction, wherein the direction and the reference direction, in particular when viewed in a projection plane, form an angle of 90° and the angle has a maximum deviation of particularly less than 8°, advantageously less than 5° and particularly advantageously less than 2°. The term "substantially parallel" is intended to be understood here in particular to be an orientation of a direction relative to a reference direction, in particular in a plane, wherein the direction has relative to the reference direction a deviation in particular less than 8°, advantageously less than 5° and particularly advantageously less than 2°. It is also conceivable for the discharge guiding unit, in particular the discharge guiding element, to be adjustable in at least two degrees of freedom. It is conceivable for the orientation of the longitudinal axis of the discharge guiding element to be adjustable relative to the main extent axis of the insertion tool receiving region by means of a movement, in particular rotation, of the discharge guiding element relative to the insertion tool receiving region. Preferably, a movement of the discharge guiding element is at least substantially blocked, in particular at least relative to the insertion tool receiving region, at least during operation, particularly preferably at least when the suction adapter, in particular the discharge guiding element, is connected to the suction apparatus of the hand-operated machine tool and the insertion tool. It is conceivable for the suction adapter, in particular the discharge guiding element, to be supported at least during operation along the longitudinal axis movably on a suction apparatus housing of the suction apparatus and/or on the hand-operated machine tool, wherein the suction adapter, in particular the discharge guiding element, is arranged to be fixed in position relative to the insertion tool. The discharge guiding element is preferably connected in an air-tight manner to the suction apparatus housing at least during operation. Alternatively, it is also conceivable for the suction adapter, in particular the discharge guiding element, to be arranged, at least during operation along the longitudinal axis in a non-movable manner on the suction apparatus housing of the suction apparatus and/or on the hand-operated machine tool, wherein the suction adapter, in particular the discharge guiding element, is supported movably relative to the insertion tool. It is further conceivable for the discharge guiding element to be movable relative to the insertion tool receiving region, at least if the suction adapter, in particular the discharge guiding element, is connected to the external suction apparatus. However, it is also conceivable, in particular in at least one embodiment, for the discharge guiding element to be constructed in a completely non-movable manner relative to the insertion tool receiving region. Advantageously, a particularly flexible assembly of a suction apparatus on the suction adapter can be enabled. An assembly direction during connection of the suction adapter to a suction apparatus can advantageously be varied. In a particularly simple manner, a connection of the suction adapter to an external suction apparatus or to a suction apparatus of a hand-operated machine tool can advantageously be produced. Advantageously, an orientation of the longitudinal axis of the discharge guiding element can be adjusted for assembly.

It is further proposed that the discharge guiding unit comprise, in particular in at least one embodiment, at least one additional discharge guiding element which delimits or surrounds in particular the insertion tool receiving region, wherein the discharge guiding element and the additional discharge guiding element are movably supported relative to each other along and/or about a movement axis of the discharge guiding unit. Preferably, the discharge guiding element and the additional discharge guiding element delimit the suction channel. By moving the discharge guiding element relative to the additional discharge guiding element along and/or about the movement axis of the discharge guiding unit, it is in particular possible to adjust the orientation of the longitudinal axis of the discharge guiding element. By moving the discharge guiding element relative to the additional discharge guiding element along and/or about the movement axis of the discharge guiding unit, it is preferably possible to adapt or adjust a suction channel extent of the suction channel. The suction adapter preferably comprises, in particular in at least one embodiment, at least one bearing unit, which allows the movement of the discharge guiding element relative to the additional discharge guiding element. The bearing unit can be constructed, for example, as a rotary bearing or linear bearing. Preferably, the bearing unit is constructed as a rotary joint. A rotation axis of the bearing unit preferably corresponds to the movement axis of the discharge guiding unit. The bearing unit can, for example, be constructed at least partially integrally with the discharge guiding unit. The fact that two units are constructed "partially integrally" with each other is particularly intended to be understood to mean that the units have at least one, in particular at least two, advantageously at least three common elements which are components of both units, in particular functionally important components. It is conceivable for at least one bearing element of the bearing unit to be constructed at least partially integrally with the discharge guiding element and with the additional discharge guiding element. The term "integrally" is intended to be understood in particular to mean connected at least in a materially engaging manner, for example, by a welding process, a bonding process, an injection-moulding process and/or another process which appears to be advantageous to the person skilled in the art, and/or advantageously understood to be formed in one piece, such as, for example, by being produced from a casting and/or by being produced with a single-component or multiple-component injection-moulding method and advantageously from a single blank. However, it is alternatively also conceivable for the bearing unit to be constructed separately relative to the discharge guiding unit, wherein the bearing unit can preferably be arranged between the discharge guiding element and the additional discharge guiding element on the discharge guiding unit in order to produce the bearing. Advantageously, a particularly flexible assembly of a suction apparatus on the suction adapter can be enabled. An assembly direction during connection of the suction adapter to a suction apparatus can advantageously be varied. Advantageously, an orientation of the longitudinal axis of the discharge guiding element can be adjusted particularly easily in a precisely fitting manner for a connection to a suction apparatus. A guided adjustment of the longitudinal axis of the discharge guiding element can advantageously be brought about.

It is further proposed that the movement axis extend perpendicularly to or parallel with the longitudinal axis of the discharge guiding element in at least one operating state. In particular, the bearing unit of the suction adapter is constructed and/or arranged in such a manner that the movement axis extends perpendicularly to or parallel with the longitudinal axis of the discharge guiding element. Preferably, a portion of the suction channel delimited by the discharge guiding element extends in a rectilinear, bent or at least partially curved manner, in particular at least when viewed along the suction channel extent of the suction channel. A portion of the suction channel delimited by the additional discharge guiding element preferably extends at least substantially completely rectilinearly, in particular at least when viewed along the suction channel extent of the suction channel. The term "at least substantially completely" is intended to be understood to be in particular at least 50%, preferably at least 70% and particularly preferably at least 90% of a total volume of a region, in particular the suction channel. However, it is also conceivable for the portion of the suction channel delimited by the additional discharge guiding element to extend in a bent or at least partially curved manner, in particular at least when viewed along the suction channel extent of the suction channel. It is conceivable, preferably in at least one embodiment, for the longitudinal axis of the discharge guiding element to be arranged coaxially relative to a longitudinal axis of the additional discharge guiding element. Preferably, at least the portion of the suction channel which is delimited by the discharge guiding element extends at least partially parallel with the portion of the suction channel which is delimited by the additional discharge guiding element. In particular, a suction channel inlet which is delimited by the discharge guiding element is arranged at an additional suction channel outlet which is delimited by the additional discharge guiding element. The additional discharge guiding element is surrounded in a region of the suction channel outlet of the additional discharge guiding element, in particular in at least one embodiment, preferably by the discharge guiding element, or the discharge guiding element is surrounded in a region of the suction channel inlet of the discharge guiding element by the additional discharge guiding element, preferably at least when viewed in a peripheral direction of the discharge guiding element and/or the additional discharge guiding element which extends in a plane perpendicular to the longitudinal axis of the discharge guiding element and/or the additional discharge guiding element. Advantageously, an assembly direction during a connection of the suction adapter to a suction apparatus can be varied. Advantageously, by moving the discharge guiding element relative to the additional discharge guiding element along and/or about the movement axis, an orientation of the longitudinal axis of the discharge guiding element can be adjusted particularly simply in a precisely fitting manner for a connection to a suction apparatus.

It is further proposed that the discharge guiding element, in particular in at least one embodiment, delimit at least one additional suction channel outlet which is provided for connecting an external suction apparatus, in particular the one already mentioned above, and/or a suction apparatus, in particular the one already mentioned above, of a hand-operated machine tool, in particular the one already mentioned above, wherein the suction channel outlet and the additional suction channel outlet define main outlet flow directions which extend transversely relative to each other. Preferably, a main outlet flow direction of the suction channel outlet extends at least substantially parallel with the main extent axis of the insertion tool receiving region and/or along the main extent axis of the insertion tool receiving region. A main outlet flow direction of the additional suction channel outlet preferably extends at least substantially perpendicularly to the main outlet flow direction of the suction channel outlet and/or the main extent axis of the insertion tool receiving region. However, it is also conceivable for the main outlet flow directions of the suction channel outlet and the additional suction channel outlet to extend relative to each other differently from a manner angled at least substantially perpendicularly or to extend relative to each other at least substantially anti-parallel or parallel. Advantageously, a particularly high level of connection flexibility of the suction adapter with respect to an external suction apparatus and/or a suction apparatus of a hand-operated machine tool can be enabled with, at the same time, a robust construction type of the discharge guiding unit. In a structurally simple manner, a connection flexibility of the suction adapter with respect to an external suction apparatus and/or a suction apparatus of a hand-operated machine tool can advantageously be achieved.

It is further proposed that the discharge guiding unit, in particular in at least one embodiment, comprise at least one valve unit, in particular the one already mentioned above, in particular a 3-way valve which is provided at least to control a suction action through the suction channel outlet. Preferably, the valve unit is arranged at least substantially completely inside the discharge guiding unit, particularly preferably at least substantially completely inside the discharge guiding element. The valve unit is particularly arranged in the suction channel. The valve unit is preferably arranged in the insertion tool receiving region, in particular in at least one embodiment. The valve unit is preferably constructed as a 3-way valve. However, it is also conceivable for the valve unit to be constructed as a different valve which appears to be advantageous to a person skilled in the art. The valve unit is preferably provided to adapt or to change a suction valve extent of the suction channel. The valve unit is provided to adapt the suction channel extent of the suction channel by partially blocking or releasing the suction channel. The valve unit is preferably provided to release or block a suction channel extent of the suction channel at least through the suction channel outlet. The valve unit is preferably adjustable in such a manner that the suction channel extent of the suction channel extends through the suction channel outlet and/or the additional suction channel outlet. It is also conceivable for the valve unit to be adjustable in such a manner that the suction channel extent of the suction channel through the suction channel outlet and the additional suction channel outlet is blocked. Preferably, the valve unit is arranged to be at least partially movable on the discharge guiding unit relative to the discharge guiding unit, in particular relative to the discharge guiding element. The valve unit is preferably adjustable by a user. The valve unit preferably comprises at least one control element, by means of which the user can change or adjust the suction channel extent of the suction channel. The control element is constructed, for example, as a rotary knob, adjustment wheel, push-button, touch-screen or the like. The control element is preferably arranged on an external surface of the discharge guiding unit, in particular on an external surface of the discharge guiding element. Advantageously, a suction channel extent of the suction channel through the suction adapter can be adapted. A particularly effective suction can advantageously be ensured with, at the same time, a high level of connection flexibility of the suction adapter with respect to a suction apparatus. It is advantageously also possible to counteract an undesirable discharge of waste material from the suction channel.

It is further proposed that the suction adapter, in particular in at least one embodiment, comprise at least one closure element, in particular the one already mentioned above, in particular a closure cap, which can be releasably fixed to the discharge guiding element for closing the suction channel outlet. The closure element is preferably provided to adapt or to change the suction channel extent of the suction channel. The closure element is provided to adapt the suction channel extent of the suction channel by partially blocking or releasing the suction channel. The closure element is constructed, for example, as a closure cap, stopper or the like. Preferably, the suction channel outlet or the additional suction channel outlet can be closed by means of the closure element. The closure element preferably has at least one raised portion and/or recess, in particular a groove, which is provided to produce a fixing action of the closure element to the discharge guiding element by cooperation with a raised portion and/or a recess in the discharge guiding element. It is also conceivable for a thread which is provided to cooperate with at least one thread on the discharge guiding element for fixing the closure element to the discharge guiding element to be constructed on the closure element. It is further conceivable for the suction adapter to comprise at least one additional closure element which is provided to close the suction channel outlet or the additional suction channel outlet. In particular, the suction channel outlet and the additional suction channel outlet can be closed by means of the closure element and the additional closure element. By closing the suction channel outlet or the additional suction channel outlet, in particular by means of the closure element or the additional closure element, the suction channel extent of the suction channel can be changed. The closure element and/or the additional closure element is/are preferably provided to completely cover the suction channel outlet and/or the additional suction channel outlet at least in a main outlet flow direction of the suction channel outlet and/or the additional suction channel outlet. It is conceivable for the closure element, in particular in at least one embodiment, to be able to be arranged on the discharge guiding element in such a manner that a centre axis of a closure face of the closure element extends coaxially relative to the main extent axis of the insertion tool receiving region, wherein the closure element preferably has at least one insertion tool introduction recess, through which the insertion tool can be guided when the suction adapter is connected to the insertion tool. Advantageously, a suction channel extent of the suction channel through the suction adapter can be adapted. A particularly effective suction can advantageously be ensured with, at the same time, a high level of connection flexibility of the suction adapter with respect to a suction apparatus. It is advantageously possible to counteract undesirable contamination of the suction channel. It is advantageously possible to counteract undesirable discharge of waste material from the suction channel.

The disclosure further relates to an insertion tool system having at least one insertion tool, in particular the one already mentioned above, in particular a suction drill, and having at least one suction adapter according to the disclosure. It is proposed that the longitudinal axis of the discharge guiding element be orientated parallel with a main extent axis of the insertion tool at least in the region of the suction channel outlet in at least one operating state. The main extent axis of the insertion tool receiving region preferably extends in at least one operating state at least substantially parallel with a main extent axis of the insertion tool. The discharge guiding unit preferably surrounds the insertion tool in at least one operating state at least substantially completely in a peripheral direction of the insertion tool which extends in a plane perpendicular to the main extent axis of the insertion tool, in particular at least partially when viewed along the main extent axis of the insertion tool. The insertion tool suction channel of the insertion tool is connected in technical fluid terms to the discharge guiding unit, in particular to the suction channel, in particular in at least one operating state. Preferably, an insertion tool suction channel outlet of the insertion tool suction channel is arranged in at least one operating state inside the discharge guiding unit. The insertion tool suction channel outlet of the insertion tool suction channel is arranged in at least one operating state inside the insertion tool receiving region. An insertion tool system which can be connected in a particularly simple and flexible manner to a suction apparatus can advantageously be provided.

It is further proposed that the insertion tool, in particular in at least one embodiment, be arranged in at least one operating state at least partially inside a valve unit of the suction adapter, in particular the one already mentioned above. An adaptation of a suction channel extent of the suction channel can advantageously be achieved with, at the same time, a particularly compact construction type of the suction adapter. In at least one embodiment, a change of the suction channel extent of the suction channel is blocked by means of the valve unit as long as the suction adapter is connected to the insertion tool. However, it is also conceivable, in particular in at least one additional embodiment, for the change of the suction channel extent of the suction channel to be possible by means of the valve unit when the suction adapter is connected to the insertion tool.

Furthermore, a hand-operated machine tool system having an insertion tool system according to the disclosure and having at least one hand-operated machine tool, on which the insertion tool system can be arranged, is proposed. The hand-operated machine tool preferably has at least one receiving region for fixing the suction apparatus of the hand-operated machine tool. It is conceivable for the hand-operated machine tool to comprise an energy supply unit, for example, an accumulator, which is provided to supply the suction apparatus of the hand-operated machine tool with energy. Advantageously, a hand-operated machine tool system which allows a particularly flexible and comfortable connection of a suction apparatus to the hand-operated machine tool system can be provided. A flexibility of a suction adapter can advantageously be increased. Advantageously, a particularly high level of comfort can be achieved in the case of a connection of the suction adapter to an insertion tool and a suction apparatus. A connection of an insertion tool to a suction apparatus can advantageously be produced in a particularly comfortable manner.

The suction adapter according to the disclosure, the insertion tool system according to the disclosure and/or the hand-operated machine tool system according to the disclosure is/are not intended to be limited to the above-described application and embodiment. In particular, the suction adapter according to the disclosure, the insertion tool system according to the disclosure and/or the hand-operated machine tool system according to the disclosure may have a number of individual elements, components and units different from the number mentioned herein in order to perform a function described herein. Furthermore, in the value ranges set out in this disclosure, values which lie within the limits mentioned should also be considered to be disclosed and to be freely useable.

BRIEF DESCRIPTION OF THE DRAWINGS

Additional advantages will be appreciated from the following description of the drawings. Seven embodiments of the disclosure are illustrated in the drawings. The drawings, description and claims contain a number of features in combination. The person skilled in the art will advantageously also consider the features individually and combine them to form advantageous additional combinations.

In the drawings.

DETAILED DESCRIPTION

Figure 1:
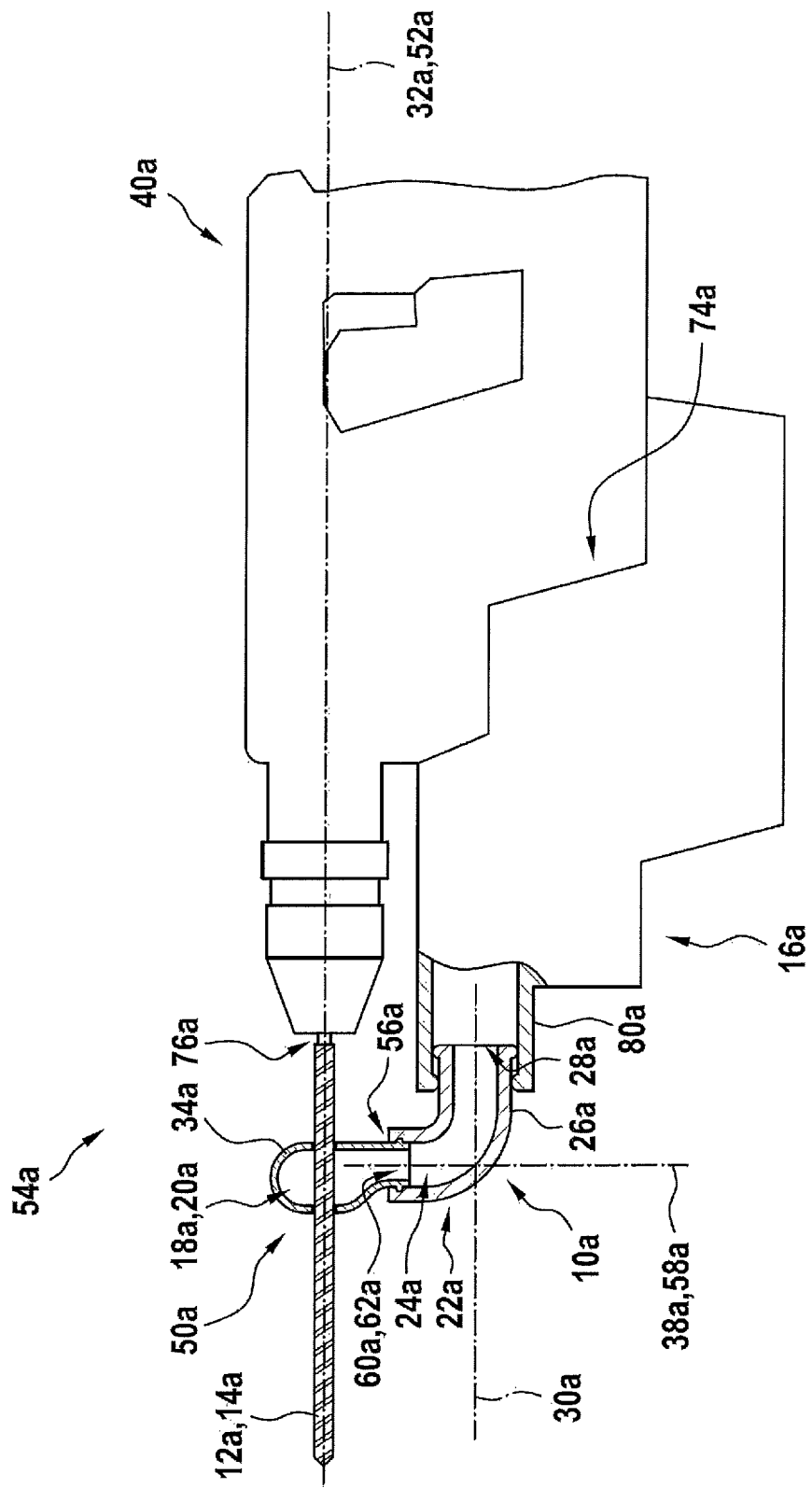
FIG. 1 shows a hand-operated machine tool system according to the disclosure having an insertion tool system according to the disclosure which comprises at least one suction adapter according to the disclosure.

FIG. 1 shows a hand-operated machine tool system 54a which is depicted at least partially as a sectional view. The hand-operated machine tool system 54a comprises at least one insertion tool system 50a and at least one hand-operated machine tool 40a, on which the insertion tool system 50a can be arranged. The insertion tool system 50a has at least one insertion tool 12a. The insertion tool 12a is constructed as a suction drill 14a. The insertion tool 12a is provided for arrangement in an insertion tool receiving member 76s of the hand-operated machine tool 40a. The insertion tool system 50a comprises at least one suction adapter 10a for connecting the insertion tool 12a to a suction apparatus 16a. The suction adapter 10a is arranged on the insertion tool 12a. The suction apparatus 16a is constructed as a suction apparatus 16a of the hand-operated machine tool 40a, in particular as a removable suction module. However, the suction apparatus 16a may alternatively also be constructed as an external suction apparatus, wherein the external suction apparatus is constructed, for example, as a vacuum cleaner or the like. The suction apparatus 16a is fitted and secured on a receiving region 74a of the hand-operated machine tool 40a. The suction adapter 10a is constructed as a suction drill suction adapter. The suction adapter 10a has at least one insertion tool receiving region 18a, in which the insertion tool 12a can be arranged and which has at least one connection interface 20a with respect to an insertion tool suction channel of the insertion tool 12a. The suction adapter 10a comprises at least one discharge guiding unit 22a which delimits a suction channel 24a. The discharge guiding unit 22a is constructed in a dimensionally stable manner. The discharge guiding unit 22a comprises at least one discharge guiding element 26a which delimits a suction channel outlet 28a and which has a longitudinal axis 30a which is orientated in a region of the suction channel outlet 28a in at least one operating state parallel with a main extent axis 32a of the insertion tool receiving region 18a. The longitudinal axis 30a of the discharge guiding element 26a extends parallel with the main extent axis 32a of the insertion tool receiving region 18a at least when the suction adapter 10a, in particular the discharge guiding element 26a, is connected to the suction apparatus 16a of the hand-operated machine tool 40a.

The longitudinal axis 30a of the discharge guiding element 26a is orientated parallel with a main extent axis 52a of the insertion tool 12a at least in the region of the suction channel outlet 28a in at least one operating state. The main extent axis 32a of the insertion tool receiving region 18a extends in at least one operating state at least substantially parallel with the main extent axis 52a of the insertion tool 12a. The discharge guiding unit 22a surrounds the insertion tool 12a in at least one operating state, when viewed along the main extent axis 52a of the insertion tool 12a, at least partially, at least substantially completely in a peripheral direction of the insertion tool 12a. The insertion tool suction channel of the insertion tool 12a is connected in at least one operating state in technical fluid terms to the discharge guiding unit 22a, in particular to the suction channel 24a. An insertion tool suction channel outlet of the insertion tool suction channel is arranged in at least one operating state inside the discharge guiding unit 22a. The insertion tool suction channel outlet of the insertion tool suction channel is arranged in at least one operating state inside the insertion tool receiving region 18a.

The discharge guiding unit 22a comprises at least one additional discharge guiding element 34a, wherein the discharge guiding element 26a and the additional discharge guiding element 34a are mounted in a movable manner relative to each other about a movement axis 38a of the discharge guiding unit 22a. Alternatively or additionally, it is conceivable for the discharge guiding element 26a and the additional discharge guiding element 34a to be mounted in a movable manner relative to each other along the movement axis 38a of the discharge guiding unit 22a. The movement axis 38a extends in at least one operating state parallel with the longitudinal axis 30a of the discharge guiding element 26a. The discharge guiding element 26a is connected to the suction apparatus 16a of the hand-operated machine tool 40a. The movement axis 38a of the discharge guiding unit 22a extends parallel with the longitudinal axis 30a of the discharge guiding element 26a at least when the suction adapter 10a, in particular the discharge guiding element 26a, is connected to the suction apparatus 16a of the hand-operated machine tool 40a. The additional discharge guiding element 34a delimits or surrounds the insertion tool receiving region 18a. The discharge guiding element 26a and the additional discharge guiding element 34a are constructed as tubular hollow members. The discharge guiding element 26a and the additional discharge guiding element 34a have a round internal cross section and a round external cross section. In principle, however, it is also conceivable for the internal cross section and/or the external cross section of the discharge guiding element 26a and/or the additional discharge guiding element 34a to be polygonal.

An orientation of the longitudinal axis 30a of the discharge guiding element 26a is adjustable relative to the main extent axis 32a of the insertion tool receiving region 18a. The discharge guiding element 26a is steplessly adjustable relative to the main extent axis 32a of the insertion tool receiving region 18a in at least one orientation plane in order to orientate the longitudinal axis 30a of the discharge guiding element 26a differently. The orientation plane extends at least substantially parallel with the main extent axis 32a of the insertion tool receiving region 18a. The orientation of the longitudinal axis 30a of the discharge guiding element 26a relative to the main extent axis 32a of the insertion tool receiving region 18a is adjustable by means of a movement, in particular rotation, of the discharge guiding element 26a relative to the insertion tool receiving region 18a and/or relative to the additional discharge guiding element 34a about the movement axis 38a. By moving the discharge guiding element 26a relative to the additional discharge guiding element 34a about the movement axis 38a of the discharge guiding unit 22a, a suction channel extent of the suction channel 24a can be adapted or changed. A movement of the discharge guiding element 26a is at least substantially blocked at least during operation, in particular at least when the suction adapter 10a, in particular the discharge guiding element 26a, is connected to the suction apparatus 16a of the hand-operated machine tool 40a and the insertion tool 12a, at least relative to the insertion tool receiving region 18a. The suction adapter 10a, in particular the discharge guiding element 26a, is movably supported at least during operation along the longitudinal axis 30a on a suction apparatus housing 80a of the suction apparatus 16a of the hand-operated machine tool 40a, wherein the suction adapter 10a, in particular the discharge guiding element 26a, is arranged to be fixed in position on the insertion tool 12a relative to the insertion tool 12a. The discharge guiding element 26a is connected to the suction apparatus housing 80a in an air-tight manner at least during operation. Alternatively, it is also conceivable for the suction adapter 10a, in particular the discharge guiding element 26a, to be arranged in a non-movable manner along the longitudinal axis 30a on the suction apparatus housing 80a of the suction apparatus 16a of the hand-operated machine tool 40a at least during operation, wherein the suction adapter 10a, in particular the discharge guiding element 26a, is movably supported relative to the insertion tool 12a. It is also conceivable for the discharge guiding element 26a to be connected to an external suction apparatus, wherein the discharge guiding element 26a is movable at least during operation relative to the insertion tool receiving region 18a at least about the movement axis 38a. The suction adapter 10a comprises at least one bearing unit 56a for movably supporting the discharge guiding element 26a relative to the additional discharge guiding element 34a about the movement axis 38a. The bearing unit 56a is constructed as a rotary joint. However, it is also alternatively conceivable for the bearing unit 56a to be constructed as a rotary bearing or the like. A rotation axis 58a of the bearing unit 56a corresponds to the movement axis 38a of the discharge guiding unit 22a. The bearing unit 56a is at least partially constructed integrally with the discharge guiding unit 22a. The bearing unit 56a which is constructed as a rotary joint is formed from two portions, wherein one portion is constructed integrally with the discharge guiding element 26a and one portion with the additional discharge guiding element 34a, respectively.

A portion of the suction channel 24a which is delimited by the discharge guiding element 26a extends in an at least partially curved and/or angled manner, at least when viewed along a suction channel extent of the suction channel 24a. A portion of the suction channel 24a which is delimited by the additional discharge guiding element 34a extends at least substantially completely rectilinearly, at least when viewed along the suction channel extent of the suction channel 24a. The discharge guiding element 26a is arranged coaxially relative to the additional discharge guiding element 34a on the additional discharge guiding element 34a so that at least the portion of the suction channel 24a which is delimited by the discharge guiding element 26a extends at least partially parallel with the portion of the suction channel 24a which is delimited by the additional discharge guiding element 34a. A suction channel inlet 60a which is delimited by the discharge guiding element 26a is arranged on a suction channel outlet 62a which is delimited by the additional discharge guiding element 34a. The additional discharge guiding element 34a is surrounded in a region of the suction channel outlet 62a of the additional discharge guiding element 34a by the discharge guiding element 26a, at least when viewed along a peripheral direction of the additional discharge guiding element 34a.

FIGS. 2 to 7 show additional embodiments of the disclosure. The following descriptions and the drawings are limited substantially to the differences between the embodiments, wherein reference may also be made in principle to the drawings and/or the description of the other embodiments, in particular of the embodiment of FIG. 1, with regard to identically described components, in particular with regard to components with identical reference numerals. In order to distinguish between the embodiments, the letter "a" is placed after the reference numerals of the embodiment in FIG. 1. In the embodiments of FIGS. 2 to 7, the letter a is replaced by the letters b to g.

Figure 2:
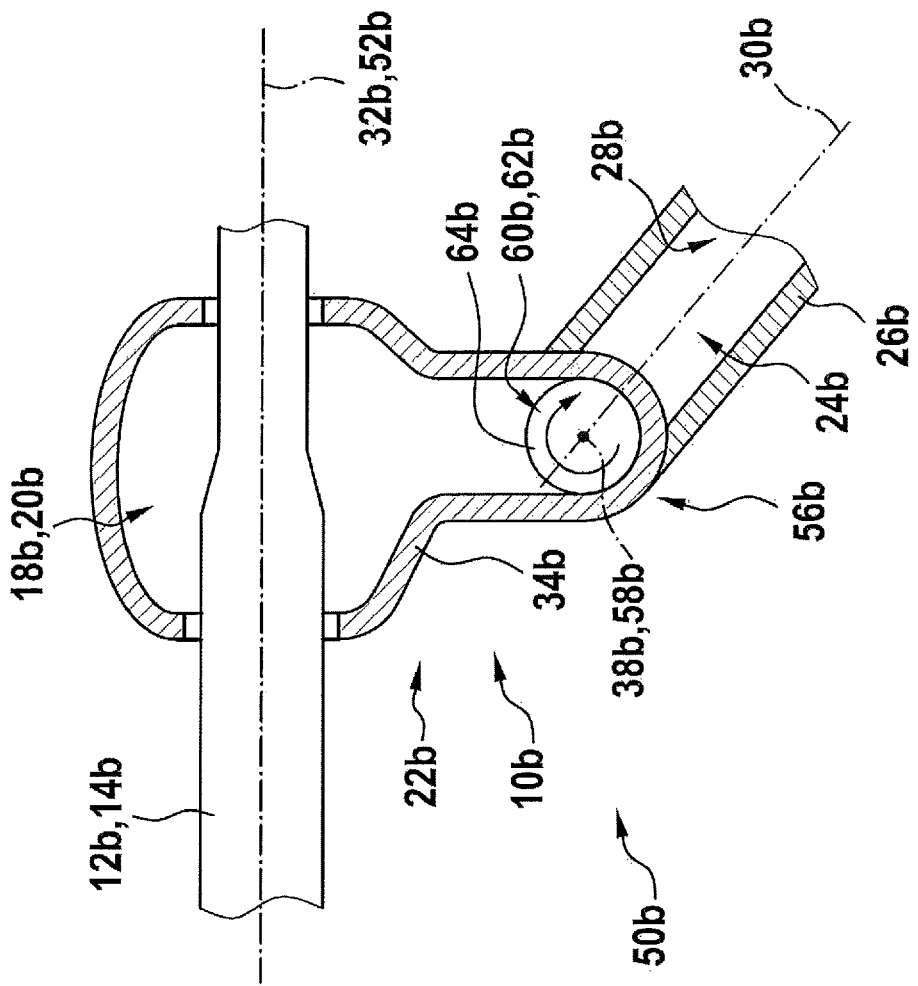
FIG. 2 shows a suction adapter according to the disclosure in a first alternative embodiment.

FIG. 2 shows an insertion tool system 50b having at least one insertion tool 12b and having at least one suction adapter 10b for connecting the insertion tool 12b to a suction apparatus (not illustrated in greater detail here) as a sectional illustration. The insertion tool 12b is constructed as a suction drill 14b. The suction adapter 10b is constructed as a suction drill suction adapter. The suction adapter 10b has at least one insertion tool receiving region 18b, in which the insertion tool 12b can be arranged and which has at least one connection interface 20b with respect to an insertion tool suction channel of the insertion tool 12b. The suction adapter 10b comprises at least one discharge guiding unit 22b which delimits a suction channel 24b. The discharge guiding unit 22b is constructed in a dimensionally stable manner. The discharge guiding unit 22b comprises at least one discharge guiding element 26b which delimits a suction channel outlet 28b and which has a longitudinal axis 30b which is orientated parallel with a main extent axis 32b of the insertion tool receiving region 18b in a region of the suction channel outlet 28b in at least one operating state. The longitudinal axis 30b of the discharge guiding element 26b extends parallel with the main extent axis 32b of the insertion tool receiving region 18b at least when the suction adapter 10b, in particular the discharge guiding element 26b, is connected to the suction apparatus. The longitudinal axis 30b of the discharge guiding element 26b is orientated parallel with a main extent axis 52b of the insertion tool 12b at least in the region of the suction channel outlet 28b in at least one operating state.

The discharge guiding unit 22b comprises at least one additional discharge guiding element 34b, wherein the discharge guiding element 26b and the additional discharge guiding element 34b are supported movably relative to each other about a movement axis 38b of the discharge guiding unit 22b. Alternatively or additionally, it is conceivable for the discharge guiding element 26b and the additional discharge guiding element 34b to be supported movably relative to each other along the movement axis 38b of the discharge guiding unit 22b. The additional discharge guiding element 34b delimits or surrounds the insertion tool receiving region 18b. An orientation of the longitudinal axis 30b of the discharge guiding element 26b is adjustable relative to the main extent axis 32b of the insertion tool receiving region 18b. The movement axis 38b extends perpendicularly to the longitudinal axis 30b of the discharge guiding element 26b. The suction adapter 10b comprises at least one bearing unit 56b for movably supporting the discharge guiding element 26b relative to the additional discharge guiding element 34b about the movement axis 38b. The bearing unit 56b is constructed as a rotary joint. A rotation axis 58b of the bearing unit 56b corresponds to the movement axis 38b of the discharge guiding unit 22b. Preferably, the bearing unit 56b comprises at least one bearing element 64b which is constructed separately from the discharge guiding element 26b and the additional discharge guiding element 34b. The bearing element 64b is arranged between a suction channel outlet 62b of the additional discharge guiding element 34b, which is delimited by the additional discharge guiding element 34b, and a suction channel inlet 60b which is delimited by the discharge guiding element 26b. The discharge guiding element 26b is fixed to the additional discharge guiding element 34b via the bearing element 64b. The discharge guiding element 26b and/or the additional discharge guiding element 34b is/are able to be movably fixed to the bearing element 64b. It is also conceivable for the bearing element 64b to be constructed integrally with the discharge guiding element 26b or the additional discharge guiding element 34b.

Figure 3:
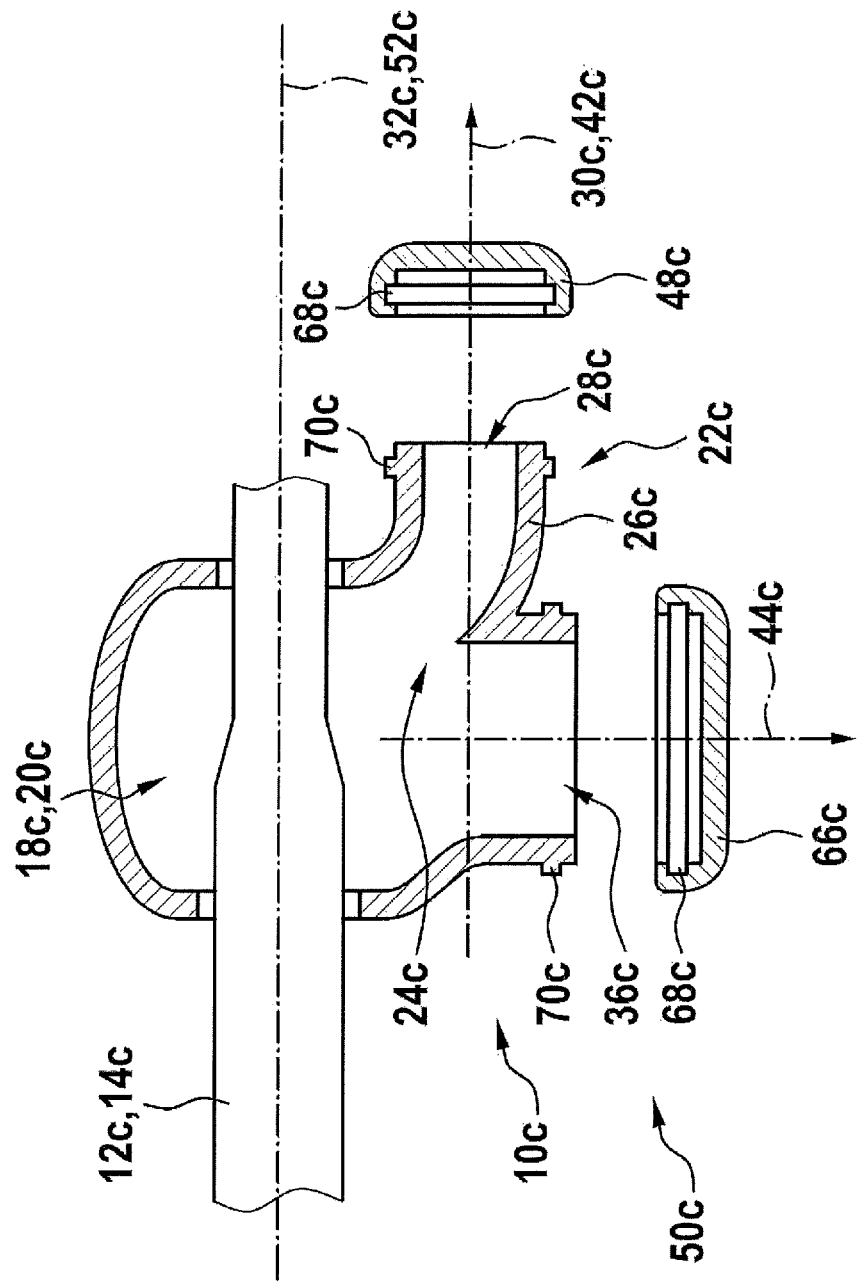
FIG. 3 shows a suction adapter according to the disclosure in a second alternative embodiment.

FIG. 3 shows an insertion tool system 50c having at least one insertion tool 12c and having at least one suction adapter 10c for connecting the insertion tool 12c to a suction apparatus as a sectional illustration. The insertion tool 12c is constructed as a suction drill 14c. The suction adapter 10c is constructed as a suction drill suction adapter. The suction adapter 10c has at least one insertion tool receiving region 18c, in which the insertion tool 12c can be arranged and which has at least one connection interface 20c with respect to an insertion tool suction channel of the insertion tool 12c.

The suction adapter 10c comprises at least one discharge guiding unit 22c which delimits a suction channel 24c. The discharge guiding unit 22c is constructed in a dimensionally stable manner. The discharge guiding unit 22c comprises at least one discharge guiding element 26c which delimits a suction channel outlet 28c and which has a longitudinal axis 30c which is orientated parallel with a main extent axis 32c of the insertion tool receiving region 18c in a region of the suction channel outlet 28c in at least one operating state. The longitudinal axis 30c of the discharge guiding element 26c is orientated parallel with a main extent axis 52c of the insertion tool 12c at least in the region of the suction channel outlet 28c in at least one operating state.

The discharge guiding element 26c delimits at least one additional suction channel outlet 36c which is provided for connecting an external suction apparatus and/or the suction apparatus. The suction channel outlet 28c and the additional suction channel outlet 36c define main outlet flow directions 42c, 44c which extend transversely relative to each other. A main outlet flow direction 42c of the suction channel outlet 28c extends at least substantially parallel with the main extent axis 32c of the insertion tool receiving region 18c. A main outlet flow direction 44c of the additional suction channel outlet 36c extends at least substantially perpendicularly to the main extent axis 32c of the insertion tool receiving region 18c and relative to the main outlet flow direction 42c of the suction channel outlet 28c.

The suction adapter 10c comprises at least one closure element 48c which can be releasably fixed to the discharge guiding element 26c for closing the suction channel outlet 28c. The closure element 48c is constructed as a closure cap. Alternatively, however, it is also conceivable for the closure element 48c to be constructed as a stopper or the like. By means of the closure element 48c, the suction channel outlet 28c or the additional suction channel outlet 36c can be closed. The closure element 48c has at least one groove 68c which is provided to produce a fixing action of the closure element 48c to the discharge guiding element 26c by cooperation with a raised portion 70c on the discharge guiding element 26c. It is also conceivable for a thread which is provided for cooperating with at least one thread on the discharge guiding element 26c for fixing the closure element 48c to the discharge guiding element 26c to be constructed on the closure element 48c. The suction adapter 10c comprises at least one additional closure element 66c which is constructed in particular identically to the closure element 48c. By means of the closure element 48c and the additional closure element 66c, the suction channel outlet 28c and the additional suction channel outlet 36c can be closed. By closing the suction channel outlet 28c or the additional suction channel outlet 36c by means of the closure element 48c or the additional closure element 66c, a suction channel extent of the suction channel 24c can be changed. The closure element 48c and/or the additional closure element 66c is/are provided to cover the suction channel outlet 28c and/or the additional suction channel outlet 36c at least in the respective main outlet flow direction 42c, 44c.

Figure 4:
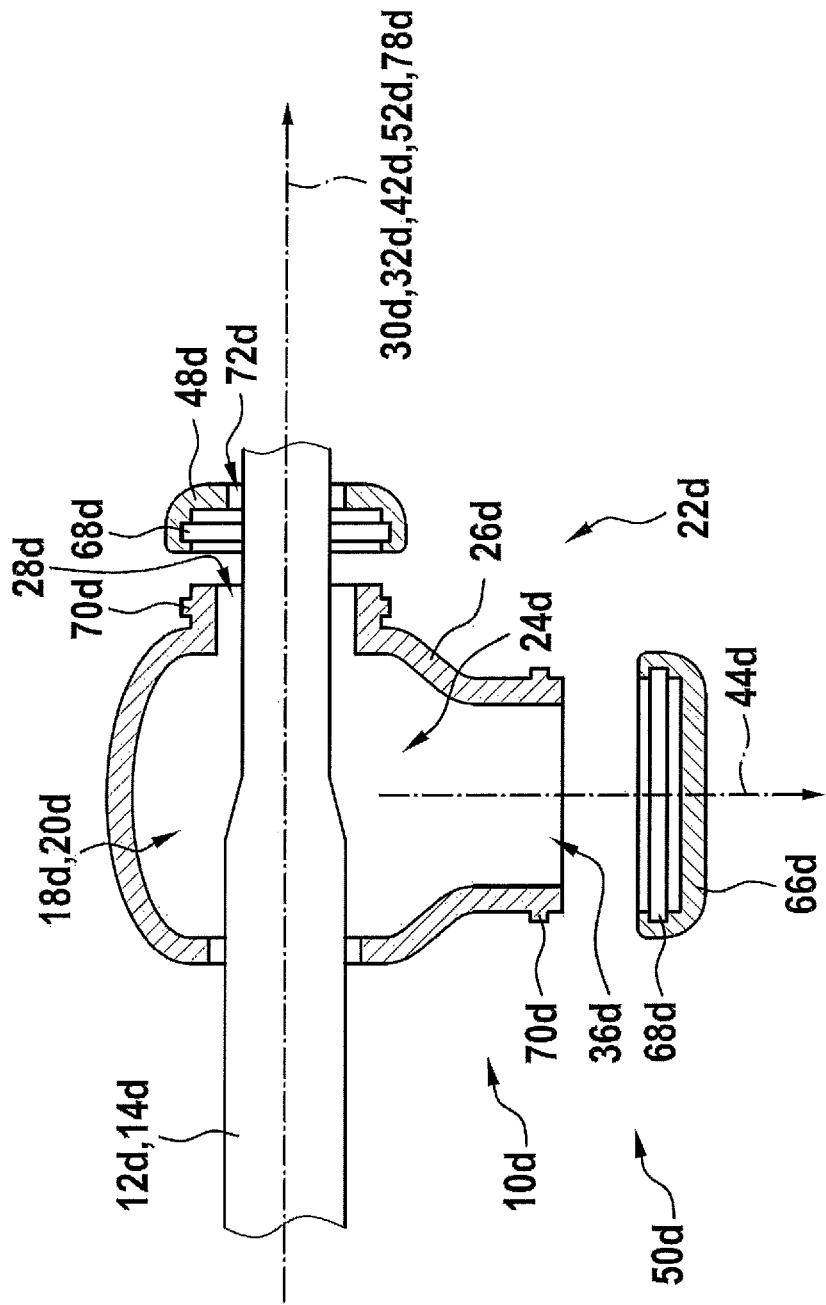
FIG. 4 shows a suction adapter according to the disclosure in a third alternative embodiment.

FIG. 4 shows an insertion tool system 50d having at least one insertion tool 12d and having at least one suction adapter 10d for connecting the insertion tool 12d to a suction apparatus as a sectional illustration. The insertion tool 12d is constructed as a suction drill 14d. The suction adapter 10d is constructed as a suction drill suction adapter. The suction adapter 10d has at least one insertion tool receiving region 18d, in which the insertion tool 12d can be arranged and which has at least one connection interface 20d with respect to an insertion tool suction channel of the insertion tool 12d.

The suction adapter 10d comprises at least one discharge guiding unit 22d which delimits a suction channel 24d. The discharge guiding unit 22d is constructed in a dimensionally stable manner. The discharge guiding unit 22d comprises at least one discharge guiding element 26d which delimits a suction channel outlet 28d and which has a longitudinal axis 30d which is orientated parallel with a main extent axis 32d of the insertion tool receiving region 18d in a region of the suction channel outlet 28d in at least one operating state. The longitudinal axis 30d of the discharge guiding element 26d is orientated parallel with a main extent axis 52d of the insertion tool 12d at least in the region of the suction channel outlet 28d in at least one operating state.

The discharge guiding element 26d delimits at least one additional suction channel outlet 36d which is provided to connect an external suction apparatus and/or the suction apparatus. The suction channel outlet 28d and the additional suction channel outlet 36d define main outlet flow directions 42d, 44d which extend transversely relative to each other. A main outlet flow 42d of the suction channel outlet 28d extends along the main extent axis 32d of the insertion tool receiving region 18d. The suction adapter 10d comprises at least one closure element 48d which can be releasably fixed to the discharge guiding element 26d in order to close the suction channel outlet 28d. The closure element 48d is constructed as a closure cap. The closure element 48d has at least one groove 68d which is provided to produce a fixing action of the closure element 48d to the discharge guiding element 26d by cooperation with a raised portion 70d on the discharge guiding element 26d. It is also conceivable for a thread which is provided to cooperate with at least one thread on the discharge guiding element 26d for fixing the closure element 48d to the discharge guiding element 26d to be constructed on the closure element 48d. The closure element 48d is arranged on the discharge guiding element 26d in such a manner that a centre axis 78d of the closure element 48d extends coaxially relative to the main extent axis 32d of the insertion tool receiving region 18d. The closure element 48d has at least one insertion tool introduction recess 72d, through which the insertion tool 12d is guided.

Figure 5:
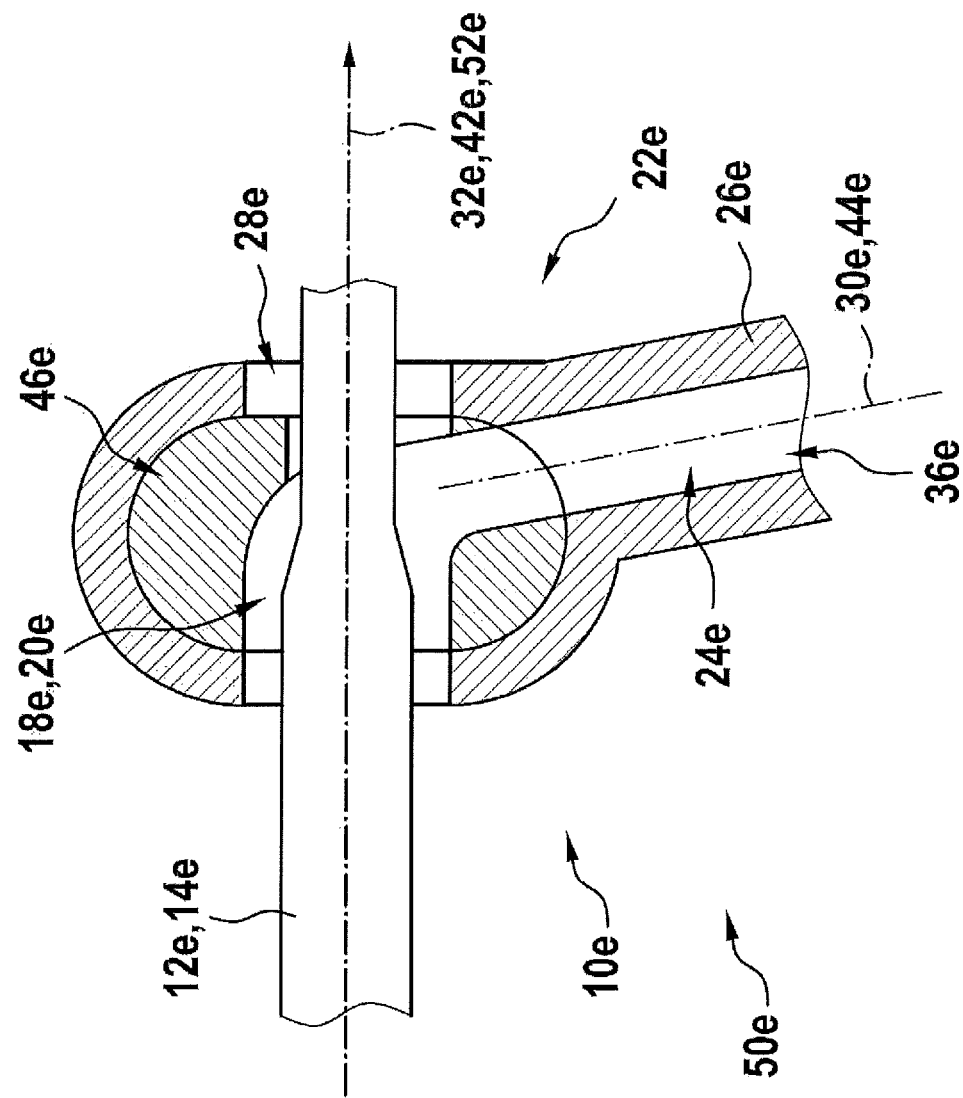
FIG. 5 shows a suction adapter according to the disclosure in a fourth alternative embodiment.

FIG. 5 shows an insertion tool system 50e having at least one insertion tool 12e and having at least one suction adapter 10e for connecting the insertion tool 12e to a suction apparatus as a sectional illustration. The insertion tool 12e is constructed as a suction drill 14e. The suction adapter 10e is constructed as a suction drill suction adapter. The suction adapter 10e has at least one insertion tool receiving region 18e, in which the insertion tool 12e can be arranged and which has at least one connection interface 20e with respect to an insertion tool suction channel of the insertion tool 12e. The suction adapter 10e comprises at least one discharge guiding unit 22e which delimits a suction channel 24e. The discharge guiding unit 22e is constructed in a dimensionally stable manner. The discharge guiding unit 22e comprises at least one discharge guiding element 26e which delimits a suction channel outlet 28e and which has a longitudinal axis 30e which is orientated parallel with a main extent axis 32e of the insertion tool receiving region 18e in a region of the suction channel outlet 28e in at least one operating state. The longitudinal axis 30e of the discharge guiding element 26e is orientated parallel with a main extent axis 52e of the insertion tool 12e at least in the region of the suction channel outlet 28e in at least one operating state. The discharge guiding element 26e delimits at least one additional suction channel outlet 36e which is provided for connecting an external suction apparatus and/or the suction apparatus. The suction channel outlet 28e and the additional suction channel outlet 36e define main outlet flow directions 42e, 44e which extend transversely relative to each other. A main outlet flow 42e of the suction channel outlet 28e extends along the main extent axis 32e of the insertion tool receiving region 18e. A main outlet flow direction 44e of the additional suction channel outlet 36e extends at least substantially perpendicularly to the main extent axis 32e of the insertion tool receiving region 18c and to the main outlet flow direction 42e of the suction channel outlet 28e.

The discharge guiding unit 22e comprises at least one valve unit 46e which is provided at least to control a suction action through the suction channel outlet 28e. The valve unit 46e is constructed as a 3-way valve. However, it is also conceivable for the valve unit 46e to be constructed as a different valve which appears to be advantageous to a person skilled in the art. The valve unit 46e is at least substantially completely arranged inside the discharge guiding unit 22e, in particular inside the discharge guiding element 26e. The valve unit 46e is arranged at least substantially completely in the suction channel 24e. The valve unit 46e is arranged on the insertion tool receiving region 18e. The valve unit 46e is provided to adapt or change a suction channel extent of the suction channel 24e. The valve unit 46e is provided to adapt the suction channel extent of the suction channel 24e by partially blocking or releasing the suction channel 24e. The valve unit 46e can be adjusted so that the suction channel extent of the suction channel 24e extends through the suction channel outlet 28e of the discharge guiding element 26e and/or the additional suction channel outlet 36e of the discharge guiding element 26e. It is also conceivable for the valve unit 46e to be adjustable so that the suction channel extent through the suction channel outlet 28e and the additional suction channel outlet 36e is blocked. The valve unit 46e is arranged at least partially movably on the discharge guiding unit 22e relative to the discharge guiding unit 22e, in particular to the discharge guiding element 26e. The valve unit 46e is adjustable by a user. The valve unit 46e comprises at least one control element (not illustrated here), by means of which a user can change or adjust the suction channel extent of the suction channel 24e. The control element is constructed, for example, as a rotary knob, adjustment wheel, push-button, touch-screen or the like. The control element is preferably arranged on an external surface of the discharge guiding unit 22e, in particular on an external surface of the discharge guiding element 26e. The insertion tool 12e is arranged in at least one operating state at least partially inside the valve unit 46e of the suction adapter. The change of the suction channel extent by means of the valve unit 46e is blocked as long as the suction adapter 10e is connected to the insertion tool 12e.

Figure 6:
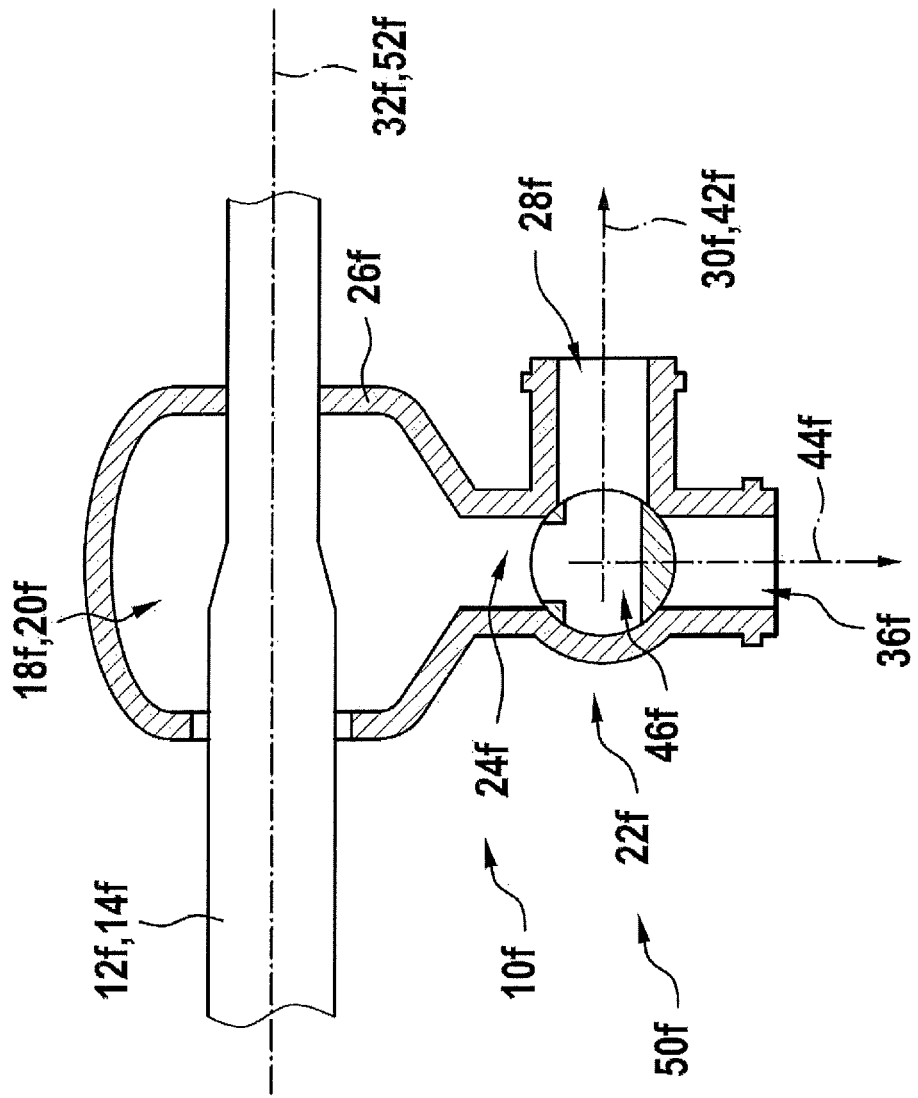
FIG. 6 shows a suction adapter according to the disclosure in a fifth alternative embodiment.

FIG. 6 shows an insertion tool system 50f having at least one insertion tool 12f and having at least one suction adapter 10f for connecting the insertion tool 12f to a suction apparatus as a sectional illustration. The insertion tool 12f is constructed as a suction drill 14f. The suction adapter 10f is constructed as a suction drill suction adapter. The suction adapter 10f has at least one insertion tool receiving region 18f, in which the insertion tool 12f can be arranged and which has at least one connection interface 20f with respect to an insertion tool suction channel of the insertion tool 12f. The suction adapter 10f comprises at least one discharge guiding unit 22f which delimits a suction channel 24f. The discharge guiding unit 22f is constructed in a dimensionally stable manner. The discharge guiding unit 22f comprises at least one discharge guiding element 26f which delimits a suction channel outlet 28f and which has a longitudinal axis 30f which is orientated parallel with a main extent axis 32f of the insertion tool receiving region 18f in a region of the suction channel outlet 28f in at least one operating state. The longitudinal axis 30f of the discharge guiding element 26f is orientated parallel with a main extent axis 52f of the insertion tool 12f at least in the region of the suction channel outlet 28f in at least one operating state. The discharge guiding element 26f delimits at least one additional suction channel outlet 36f which is provided for connecting an external suction apparatus and/or the suction apparatus. The suction channel outlet 28f and the additional suction channel outlet 36f define main discharge flow directions 42f, 44f which extend transversely relative to each other. A main discharge flow direction 42f of the suction channel outlet 28f extends at least substantially parallel with the main extent axis 32f of the insertion tool receiving region 18f. A main discharge flow direction 44f of the additional suction channel outlet 36f extends at least substantially perpendicularly to the main extent axis 32f of the insertion tool receiving region 18f and to the main discharge flow direction 42f of the suction channel outlet 28f.

The discharge guiding unit 22f comprises at least one valve unit 46f which is provided at least to control a suction action through the suction channel outlet 28f. The valve unit 46f is constructed as a 3-way valve. However, it is also conceivable for the valve unit 46f to be constructed as a different valve which appears to be advantageous to the person skilled in the art. The insertion tool receiving region 18f is arranged with spacing from the valve unit 46f. The valve unit 46f is provided to adapt or change a suction channel extent of the suction channel 24f. The valve unit 46f is provided to adapt the suction channel extent of the suction channel 24f by partially blocking or releasing the suction channel 24f. It is possible to change the suction channel extent of the suction channel 24f by means of the valve unit 46f when the suction adapter 10f is connected to the insertion tool 12f.

Figure 7:
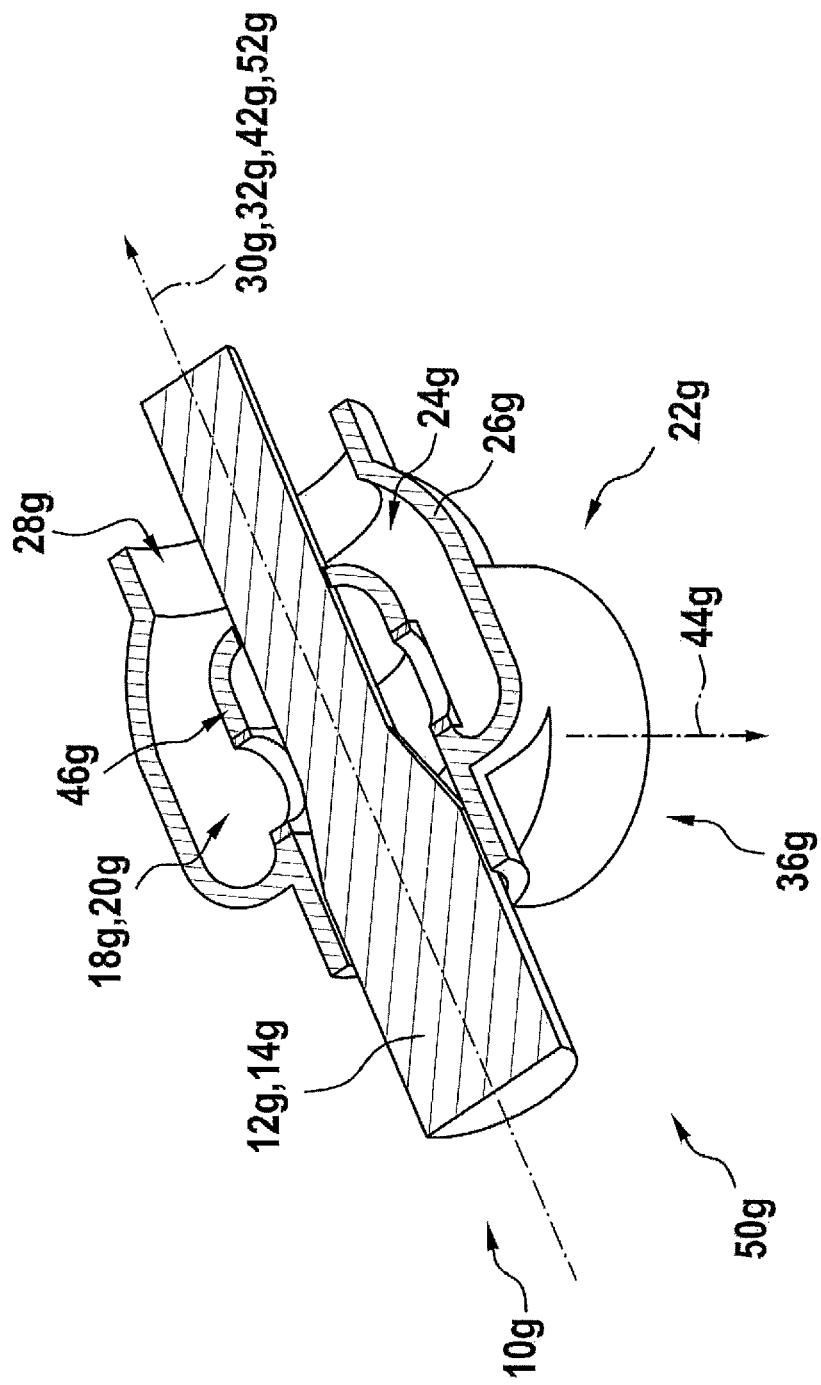
FIG. 7 shows a suction adapter according to the disclosure in a sixth alternative embodiment.

FIG. 7 shows an insertion tool system 50g having at least one insertion tool 12g and having at least one suction adapter 10g for connecting the insertion tool 12g to a suction apparatus as a sectional illustration. The insertion tool 12g is constructed as a suction drill 14g. The suction adapter 10g is constructed as a suction drill suction adapter. The suction adapter 10g has at least one insertion tool receiving region 18g, in which the insertion tool 12g can be arranged and which has at least one connection interface 20g with respect to an insertion tool suction channel of the insertion tool 12g. The suction adapter 10g comprises at least one discharge guiding unit 22g which delimits a suction channel 24g. The discharge guiding unit 22g is constructed in a dimensionally stable manner. The discharge guiding unit 22g comprises at least one discharge guiding element 26g which delimits a suction channel outlet 28g and which has a longitudinal axis 30g which is orientated parallel with a main extent axis 32g of the insertion tool receiving region 18g in a region of the suction channel outlet 28g in at least one operating state. The longitudinal axis 30g of the discharge guiding element 26g is orientated parallel with a main extent axis 52g of the insertion tool 12g at least in the region of the suction channel outlet 28g in at least one operating state. The discharge guiding element 26g delimits at least one additional suction channel outlet 36g which is provided to connect an external suction apparatus and/or the suction apparatus. The suction channel outlet 28g and the additional suction channel outlet 36g define main outlet flow directions 42g, 44g which extend transversely relative to each other. A main outlet flow 42g of the suction channel outlet 28g extends along the main extent axis 32g of the insertion tool receiving region 18g. A main outlet flow direction 44g of the additional suction channel outlet 36g extends at least substantially perpendicularly to the main extent axis 32g of the insertion tool receiving region 18g and to the main outlet flow direction 42g of the suction channel outlet 28g.

The discharge guiding unit 22g comprises at least one valve unit 46g which is provided at least to control a suction action through the suction channel outlet 28g. The valve unit 46g is constructed as a 3-way valve. However, it is also conceivable for the valve unit 46g to be constructed as a different valve which appears to be advantageous to the person skilled in the art. The valve unit 46g is arranged on the insertion tool receiving region 18g. The valve unit 46g is provided to adapt or change a suction channel extent of the suction channel 24g. The valve unit 46g is provided to adapt the suction channel extent of the suction channel 24g by partially blocking or releasing the suction channel 24g. The insertion tool 12g is arranged in at least one operating state at least partially inside the valve unit 46g of the suction adapter 10g. It is possible to change the suction channel extent of the suction channel 24g by means of the valve unit 46g when the suction adapter 10g is connected to the insertion tool 12g.

What is claimed is:

1. A suction adapter for connecting an insertion tool to a suction apparatus, comprising:
at least one insertion tool receiving region in which the insertion tool is arranged, the at least one insertion tool receiving region including at least one connection interface configured to interface with an insertion tool suction channel of the insertion tool; and
at least one discharge guiding unit defining a guiding unit suction channel and including at least one discharge guiding element that defines a suction channel outlet of the guiding unit suction channel, the at least one discharge guiding element defining a longitudinal axis,
wherein the longitudinal axis is oriented parallel to a main extent axis of the at least one insertion tool receiving region in a region of the suction channel outlet in at least one first operating state,
wherein the at least one discharge guiding element is dimensionally stable, and
wherein the at least one discharge guiding element is moveable relative to the at least one insertion tool such that an orientation of the longitudinal axis relative to the main extent axis is adjustable between the at least one first operating state and at least one second operating state in which the longitudinal axis is non-parallel with respect to the main extent axis.

2. The suction adapter as claimed in claim 1, wherein:
the at least one discharge guiding unit further includes at least one additional discharge guiding element configured to delimit or surround the at least one insertion tool receiving region, and
the at least one discharge guiding element and the at least one additional discharge guiding element movably supported relative to each other along and/or about a movement axis of the at least one discharge guiding unit.

3. The suction adapter as claimed in claim 2, wherein the movement axis extends perpendicularly to or parallel with the longitudinal axis in the at least one operating state.

4. An insertion tool system, comprising:
the suction adapter as claimed in claim 1; and the insertion tool, which is arranged in the at least one insertion tool receiving region of the suction adapter, the suction adapter connecting the insertion tool to the suction apparatus.

5. The insertion tool system as claimed in claim 4, wherein:
the suction adapter is a suction drill adapter, and
the insertion tool is a suction drill bit.

6. The suction adapter as claimed in claim 1, wherein:
the suction adapter is a suction drill adapter, and
the insertion tool is a suction drill bit.

7. The suction adapter as claimed in claim 1, wherein the at least one discharge guiding element has a movement axis that is substantially perpendicular to the main extent axis, and the at least one discharge guiding element is configured to rotate about the movement axis so as to adjust the orientation of the longitudinal axis relative to the main extent axis.

8. A suction adapter for connecting an insertion tool to a suction apparatus, comprising:
at least one insertion tool receiving region in which the insertion tool is arranged, the at least one insertion tool receiving region including at least one connection interface configured to interface with an insertion tool suction channel of the insertion tool; and
at least one discharge guiding unit defining a guiding unit suction channel and including at least one discharge guiding element that defines a suction channel outlet of the guiding unit suction channel, the at least one discharge guiding element defining a longitudinal axis,
wherein:
the longitudinal axis is oriented parallel to a main extent axis of the at least one insertion tool receiving region in a region of the suction channel outlet in at least one operating state,
the at least one discharge guiding element is dimensionally stable,
the at least one discharge guiding element delimits at least one additional suction channel outlet,
the suction channel outlet and the at least one additional suction channel outlet define main outlet flow directions extending transversely relative to each other, and
the at least one discharge guiding element defines a suction channel inlet configured to receive airflow from the insertion tool suction channel at the at least one connection interface, the suction channel inlet being fluidly connected to the suction channel outlet and to the at least one additional suction channel outlet within the at least one discharge guiding element.

9. The suction adapter as claimed in claim 8, wherein the at least one discharge guiding unit further includes at least one valve unit configured to control the fluid connection between the suction channel inlet, the suction channel outlet, and the at least one additional suction channel outlet.

10. An insertion tool system comprising:
the one suction adapter as claimed in claim 9; and
the insertion tool, which is arranged in the at least one insertion tool receiving region of the suction adapter, the suction adapter connecting the insertion tool to the suction apparatus,
wherein the insertion tool is arranged in the at least one operating state at least partially inside the valve unit of the suction adapter.

11. The suction adapter as claimed in claim 9, wherein the valve unit is configured to change a suction channel extent of the suction channel by at least partially blocking the suction channel.

12. The suction adapter as claimed in claim 9, wherein the valve unit is configured to selectively block a flow path from the suction channel inlet of the at least one discharge guiding element to one of the suction channel outlet and the additional suction channel outlet.

13. The suction adapter as claimed in claim 8, wherein:
the suction adapter is configured such that one of the suction channel outlet and the at least one additional suction channel outlet is connected to the suction apparatus, and the suction adapter, and
the suction adapter further comprises at least one closure element releasably fixed to the at least one discharge guiding element and configured to close the other of the suction channel outlet and the at least one additional suction channel outlet that is not connected to the suction adapter.

14. The suction adapter as claimed in claim 13, wherein the at least one closure element includes a closure cap.

15. A hand-operated machine tool system, comprising:
at least one hand-operated machine tool; and
an insertion tool system arranged on the at least one hand-operated machine tool, the insertion tool system including:
an insertion tool; and
at least one suction adapter configured to connect the insertion tool to a suction apparatus, the at least one suction adapter including (i) at least one insertion tool receiving region in which the insertion tool is arranged, the at least one insertion tool receiving region including at least one connection interface configured to interface with an insertion tool suction channel of the insertion tool, and (ii) at least one discharge guiding unit defining a guiding unit suction channel and including at least one discharge guiding element that defines a suction channel outlet of the guiding unit suction channel, the at least one discharge guiding element defining a longitudinal axis,
wherein the longitudinal axis is oriented parallel to a main extent axis of the at least one insertion tool receiving region in a region of the suction channel outlet in at least one first operating state,
wherein the longitudinal axis is orientated parallel with a main extent axis of the insertion tool at least in the region of the suction channel outlet in the at least one operating state,
wherein the at least one discharge guiding element is dimensionally stable, and
wherein the at least one discharge guiding element is moveable relative to the at least one insertion tool such that an orientation of the longitudinal axis relative to the main extent axis is adjustable between the at least one first operating state and at least one second operating state in which the longitudinal axis is non-parallel with respect to the main extent axis.

16. The hand-operated machine tool system as claimed in claim 15, wherein:
the at least one suction adapter is a suction drill adapter, and
the insertion tool is a suction drill bit.

* * * * *